J. ILLY.
GAS TURBINE.
APPLICATION FILED MAY 10, 1907.

933,906.

Patented Sept. 14, 1909.
4 SHEETS—SHEET 3.

J. ILLY.
GAS TURBINE
APPLICATION FILED MAY 10, 1907.

933,906.

Patented Sept. 14, 1909.
4 SHEETS—SHEET 4.

UNITED STATES PATENT OFFICE.

JOHN ILLY, OF JAMESTOWN, NEW YORK.

GAS-TURBINE.

933,906.

Specification of Letters Patent. Patented Sept. 14, 1909.

Application filed May 10, 1907. Serial No. 372,869.

*To all whom it may concern:*

Be it known that I, JOHN ILLY, a citizen of the Republic of Switzerland, and resident of the city of Jamestown, in the county of Chautauqua and State of New York, have invented a new and useful Gas-Turbine, of which the following, taken in connection with the accompanying drawings, is a full, clear, and exact description.

The object of the invention is to produce, economize, and use direct the heat units of the fuel, either liquid or gaseous, to expand a medium, such as air, gas or water, to drive a turbine by the expansive force of said medium; and toward this end to provide, first, an automatically adjustable compression chamber and means for feeding either liquid or gaseous fuel to said chamber to be exploded therein by compression; second, to provide for controlling the temperature of the heat in the explosion chamber by the injection of air or water; third, to provide a mixing chamber and to equalize and control the heat, burned gas, and steam therein by the injection of air or water as a cooling medium; fourth, to provide a gas turbine so constructed that it is driven and automatically balanced by the pressure of the heated mixture of gas, air and steam; and fifth to provide suitable means for the connection and coöperation of all of these parts in a single engine.

The special type of mixing chamber hereinafter described is claimed in a divisional application, Serial Number 401,551, and the combination of a pressure generator and an engine in connection therewith is claimed in a further divisional application, Serial Number 401,552.

In the drawings.

Similar characters refer to corresponding parts in the several views.

My entire machine is a coöperating whole, each part interacting with the other parts as clearly hereinafter described; but for convenience in describing the mechanism, the machine is divided into three parts, as follows:

The letter A indicates the compressor or heat generator.

The letter B indicates the mixer, receiver, or vaporizing chamber.

The letter C indicates the turbine.

Figures 1, 2:
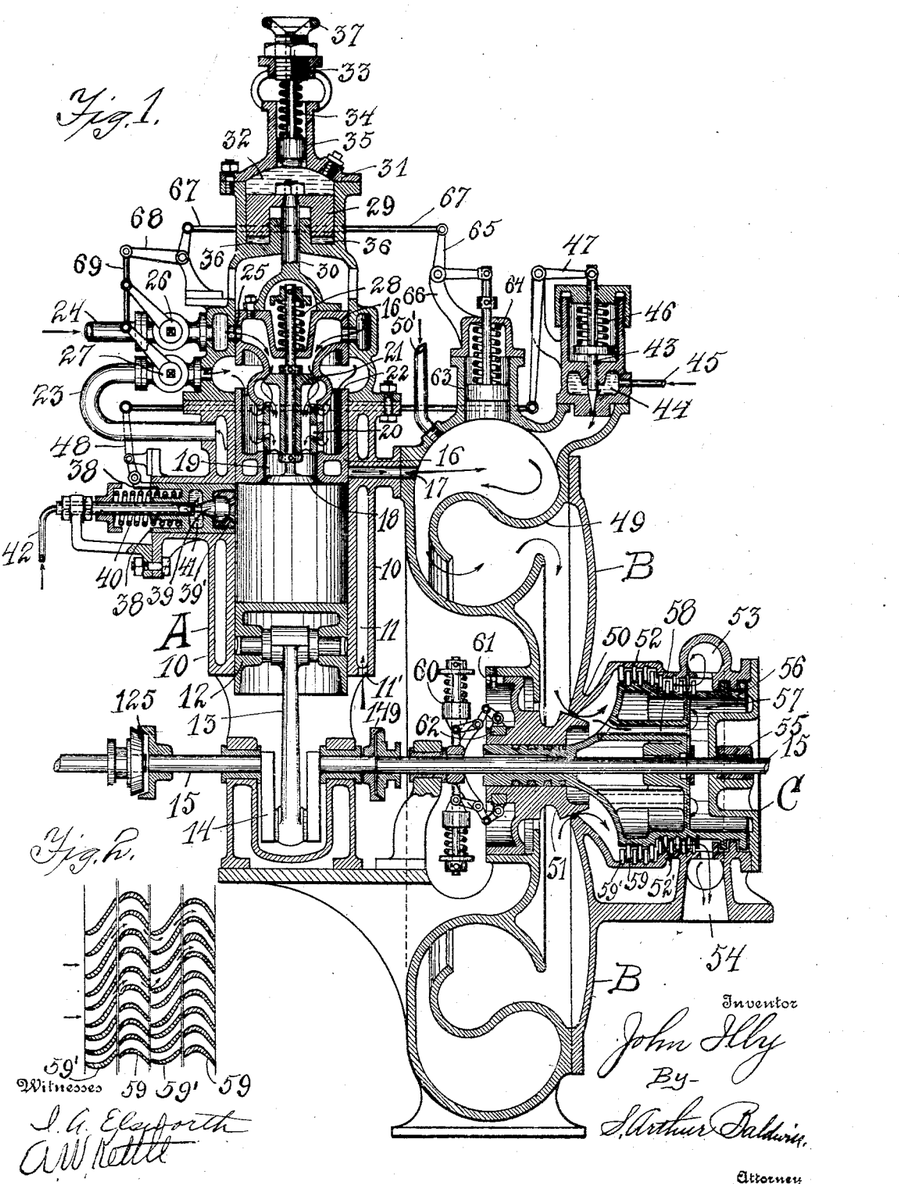
Figure 1 is a vertical sectional view of the entire turbine arranged for the use of gas as a fuel.
Fig. 2 is a detail sectional view of the arrangement of the blades on the turbine cylinder and shell, the vertical lines showing the separation of the blades.
Figures 3, 4:
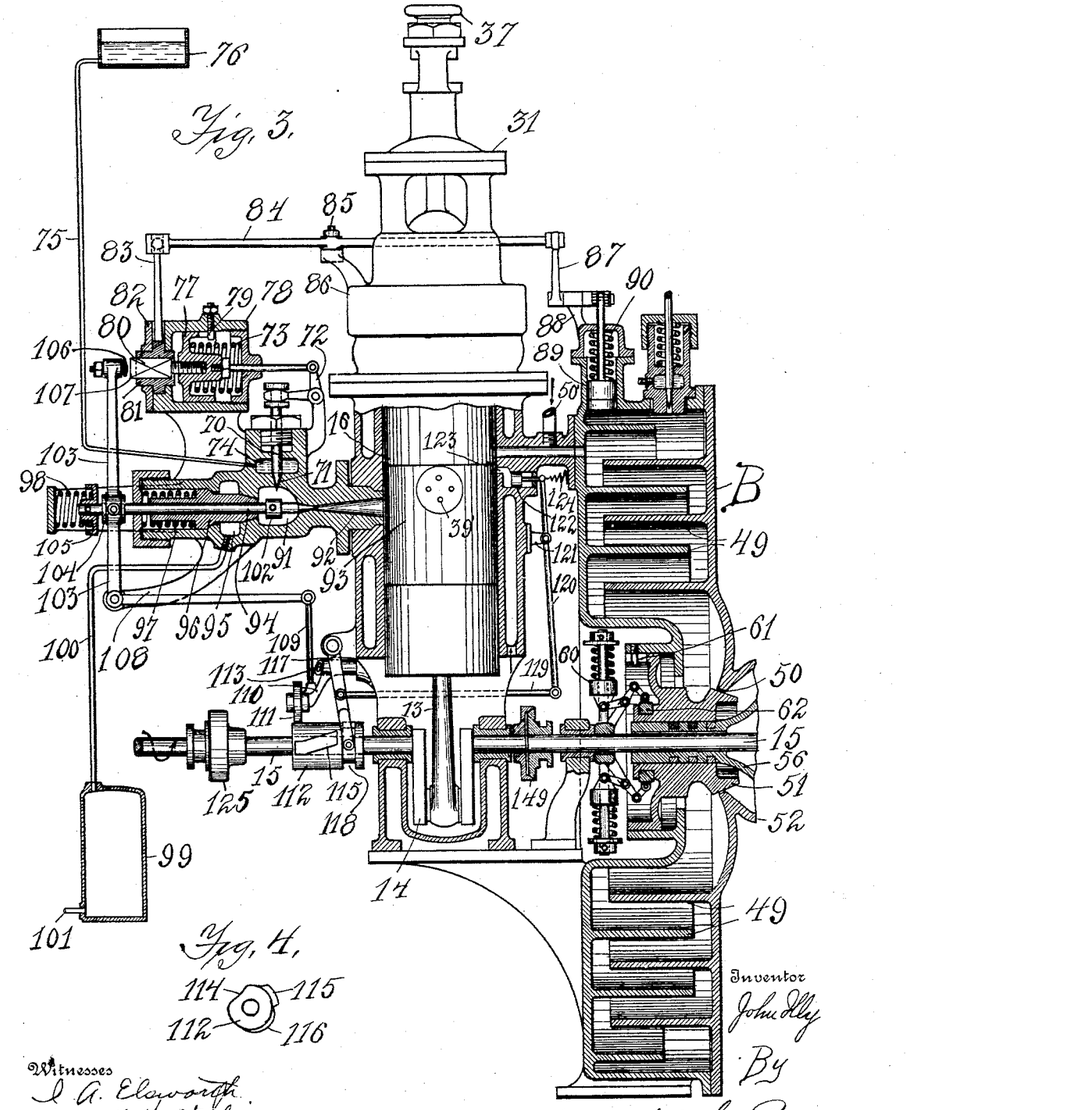
Fig. 3 is a vertical sectional view of the heat and gas generating portion of the turbine as arranged for the use of liquid fuel, the turbine cylinder being broken away.
Fig. 4 is a side elevation of the cam controlling the fuel valve.

In the heat generator A the numeral 10 indicates a double walled cylinder, which double walls provide a space 11 for air or water-cooling said cylinder. Either air or water may be used in space 11. Cylinder 10 is shown in Fig. 1 arranged for air cooling with admittance for the air through opening 11'. In Fig. 3, cylinder 10 is shown arranged for water cooling. Air is preferred for this purpose as the heat absorbed in the cooling process is more easily saved by the use of the air from space 11 to assist in the combustion, in a manner hereinafter set forth. The heat absorbed by the water may also be preserved, as hereinafter described, but not as easily. Either manner of cooling the cylinder, however, will serve my purpose.

The numeral 12 indicates a piston working within cylinder 10 and having a piston rod 13 and crank 14 to connect it with the main drive shaft 15 from turbine C in order to drive said piston. Piston 12 works in one end of cylinder 10 and a valve piston 16 of the same diameter as piston 12 is slidably mounted in the opposite end from the working piston 12. Piston 16 acts as a valve for closing port 17 to the mixer B in the side of cylinder 10, and also contains admission valve 18 for the fuel and air, which valve is opened automatically by suction of the outward stroke of piston 12.

Above valve 18 is a mixing chamber 19 for the air and gas, to which chamber 19 the air is admitted through valve 20. The gas fuel is admitted to chamber 19 through valve 21. Piston 16 is double cylindrical, that is, a cylinder within a cylinder and the outer cylinder is divided at 22 to admit the air to the outer space between the two walls of the cylinders through valve 20 and pipe 23. The gas is admitted to the inner portion of piston 16 through pipe 24 and valve ports 25, suitable valves being provided in the pipes, 26 for the gas and 27 for the air.

Valves 20 and 21 are made in one piece and a spring 28 is inclosed in the upper portion of piston 16 to close admission valve 18, gas valve 21, and air valve 20. A differential piston 29 is attached to piston 16 by means of rod 30. Piston 29 works in an extension of the casing which extension is closed by cap 31. A chamber 32 above piston 29 is filled with oil under pressure, the pressure being regulated by the screw 33 and spring 34 on piston 35. A chamber 36 is also formed beneath piston 29 which is filled with oil having a higher pressure than the oil in chamber 32. The difference in total pressure being caused by the difference of the areas of the two surfaces on piston 29. The oil in chamber 36 operates as a cushion when differential piston 29 is thrown back by the pressure in chamber 32. The pressure in the chamber 32, or a better statement would be, the sum of the pressure per square inch of the differential piston area, must equal or exceed the sum of the pressure per square inch of the area of piston 16 in the explosion chamber. This is required to obtain the temperature for the self-ignition point for each kind of fuel. The pressure in chamber 32 will be varied according to the pressure required by different kinds of fuel for self-ignition. This pressure is regulated by hand wheel 37.

It is necessary to have an energy carrier for the heat and gases. Air is preferred as such a carrier and may be injected into the explosion chamber through pipe 42 and valve 39 being under pressure greater than the explosion pressure. At times, however, the heat generated in the explosion chamber is so great that the use of air as a controlling medium is not sufficient. Accordingly water is injected through valve 39. Thus when the explosions of the gases produces a superheated condition of the cylinder walls the injection of the air and water cools the explosion chamber, thereby giving control of the temperature of the chamber and greatly prolonging the life of its metallic walls. Some forms of gases, however, do not need the use of water and for such gases the injection of water is cut off. It is apparent that by the injection of the water into the explosion chamber while in the superheated condition from the explosion, steam will be generated and that it will form a carrier for the heat generated by the explosion. The burned gases are also a carrier. It is desirable to use just as small an amount of steam as will accomplish the double purpose of cooling the walls and acting as an energy carrier.

The water is injected and the steam generated automatically directly after the explosion in the explosion cylinder so that the steam will be brought into perfect connection with the heat and burned gases. The automatic injection of the air or water is accomplished in the following manner: A cylinder piece 38 is slidably mounted in an opening in the side of cylinder 10. Piece 38 contains the seat for a fixed valve 39, which valve seat is controlled by a spring 40 pressing cylinder 38 against valve 39 with a pressure equal to the pressure necessary for self-ignition of the fuel in the compression cylinder. A chamber 41 is filled with water by pipe 42 and a lengthwise opening in the stem of valve 39 which is made hollow, there being suitable holes from said hollow stem opening into the chamber 41. Water in said chamber 41 must be under pressure greater than the explosion pressure. Valve 39 is supported on a suitable bracket on the casing. The water passes through valve 39 and through holes 39' into the explosion chamber in a fine spray.

Instead of water as liquid, it can be furnished as vapor in the explosion chamber through valve 39, and driven out in connection with the heat and burned gases by piston 12 through port 17 into the mixer or vaporizer B. Further, instead of air or water as liquid, or water as vapor, neutral gas may be injected into the explosion chamber, or a mixture of water and air, or of water and neutral gas, and the amount of any of these fluids injected as an energy carrier into the cylinder will be regulated by the amount of energy generated by each explosion, as above described, and aid in giving a uniform temperature and pressure in the vaporizer B.

Any part of the injected water in the explosion chamber which may not have time to be converted into steam in the cylinder will be carried out with the burned gases and steam through port 17 into the mixer B and will there be converted into steam. Any of these different forms of energy carriers, as above described, may also be injected directly into the mixer B, as hereinafter described, but it is preferred to inject the air and water into the smaller and very much higher heated space of the explosion cylinder, since the heat will be quicker absorbed and the walls of the explosion cylinder will be kept at a very much lower temperature as above stated.

The part B is variously called a mixer, receiver, or vaporizer and has for its purpose the receiving of the heated air, burned gases and steam from the explosion chamber and the vaporizing of water and the heating of non-combustible fluids, such as air, by bringing them in direct contact with the heat from said explosion chamber. It is constructed in its interior with a large heating surface preferably by means of the interlapping partitions 49. These partitions are cylindrical and may be curved, as shown in Fig. 1, or extended out straight from the side walls in alternate cylindrical succession so as to interlap, as shown in Fig. 3.

A sufficient number of the interlapping partitions 49 are inserted to provide the heating surface and space required to give the hot gas and heat the necessary equality of temperature. Interlapping partitions 49 mechanically mix or break up the heated gas, steam and air so that they practically become one fluid before they pass into the turbine C. Thus broadly stated, the object of the heat generator A and mixer B is to provide means for the raising of large quantities of air to a high temperature without radiation and in the shortest possible time; also the providing of means for the introduction of fluids such as air and water with the burned gases while at high temperature for the production of a product uniform in temperature and mixture. In order to preserve the uniformity of this mixture it is often necessary to inject air or water under pressure to the mixer B. Air is injected through pipe 50'.

Water is injected in mixer B through valve 43, which valve is supported in a suitable extension of the casing of the mixer, as shown, and is arranged as follows:—A chamber 44 is provided above the valve seat for the liquid, which is admitted thereto through pipe 45. Valve 43 is closed by spring 46 and is opened by means of the link connections 47 attached to the upper end of valve rod 43 and extending across and having pivotal attachment to a lever 48 attached to the outer end of sliding piece 38. Said link and lever connection are adjustable so that the amount of liquid injected into mixer B may be controlled by adjusting the exact amount of actuation of valve 43. It is apparent that valve 43 will be actuated by the explosion in the explosion chamber when it moves piece 38. The receiver B is continually filled with this mixture under high pressure from the explosion chamber. A large circular opening 50 is provided in the side of receiver B which forms a valve seat for the large circular valve 51 on extension of turbine cylinder. The mixture of steam, burned gases and heated air passes out through the whole circumference of the opening 50 into the turbine C.

The turbine C consists of the shell or casing 52 which has opening 53 extending around the same to the exhaust port 54, also the bearing 55 for shaft 15. The turbine 56 is keyed to shaft 15 within shell 52 to be turned by said shaft. Cylinder 56 is arranged at its outer end so as to provide the chamber 57, pipes or closed openings 58 extending through cylinder 56 to chamber 57 so that the steam, burned gases and heated air pass through pipes 58 into chamber 57 and balance or equalize the weight and pressure of cylinder 56. It is apparent that by adjusting the size of chamber 57 and pipes 58 to the weight of the cylinder, said cylinder may be placed in any position, vertical, horizontal, or at an angle, and the heated gas, steam, and heated air will form an equalizing support for the same. A number of series of stationary blades 59' are placed on the inner surface of stationary shell 52, and a number of alternate series of blades 59 are placed on the outer surface of revoluble cylinder 56. As the mixture of steam, gas and heated air enters the turbine cylinder, it strikes the fixed blades 59' which are so curved as to give the mixture a turn to one side. The blades 59 on the turbine cylinder 56 are cupped in the opposite direction so that the cylinder 56 is given a swift rotative movement by the shape of the blades. A sufficient number of series of stationary and movable blades are provided to exhaust the entire force of the mixture.

The expansion of the mixture of heated steam, gas and heated air in the turbine takes place adiabatically. The mixture should be so proportioned that the increase of the volume of the steam resulting from the fall of pressure allowing after-vaporization, replaces the decrease of the volume of the gas and air, which decrease is caused by the fall of pressure and temperature. It is apparent that the mixture on its entrance to the turbine has a certain velocity and that it will retain this velocity while the increase of the steam replaces the decrease of the air and gas. The ideal is to preserve this balance so that the mixture will have a constant velocity. This is hardly possible, however, since the volume of steam as an energy carrier is preferably as small as possible, as above stated; accordingly, it is usually necessary to place one or more decreasing steps 52' in the diameter of the cylinders 52 and 56 as the heated gas and air decrease in volume. The number of such steps however, is reduced to the minimum by the adiabatic expansion of heated steam, gas, and air as above described. In order to preserve a constant velocity the decreasing step 52' is necessitated at that point when the expansion of the volume of the steam fails to replace the decrease in the volume of the heated air and gas.

The heat generator A and turbine C which are on the same driving shaft 15 will be started into motion by an electric motor or any other power, until such time as sufficient power can be produced from the generator to run the turbine alone. After the turbine is once running from the power produced by the generator alone, a certain portion of the produced power will be utilized to run the heat generator.

The speed of the turbine is controlled by a governor 60 which is attached to shaft 15 and has a link connection with cylindrical valve 51. Valve 51 does not rotate with shaft 15 but is held from rotation by means of pin 61 on the inner side of the shell of receiver B, a slot being provided in the valve for pin 61. The link connection of the governor is attached to a band 62 which is rotatably mounted in a suitable groove in valve 51. It is apparent that should the speed of the turbine decrease, the governor 60 will cause the cylindrical valve 51 to move along the shaft 15 causing the area of the opening 50 to increase and the pressure of the mixture of the burned gases, steam and air through opening 50 will be less throttled and will bear upon the blades 59 of the turbine with greater pressure and less speed which will bring the turbine up to its normal speed, after which the governor 60 will by its centrifugal force move valve 51 along shaft 15, thereby making the area of the opening 50 less and causing the pressure in the receiver B to be raised and the burned gases, steam and air which pass through the opening 50 will have more speed and less volume. The governor 60 thus controls or equalizes the movement of the turbine.

The pressure of the volume of motive fluid in the receiver B will vary according to the movement of cylindrical valve 51. In order to control or equalize this pressure in receiver B, a piston 63 is provided in the casing of receiver B which piston will be raised in proportion to the increase of pressure in receiver B and lowered by a spring 64 in proportion to the decrease of pressure in receiver B. A bell crank 65 pivotally supported on the fixed arm 66 of the casing has an arm pivotally attached to the upper end of the stem of piston 63 and its other arm is attached by link connection 67 to a bell crank 68 supported in a similar manner on the casing over the inlet valves 26 and 27 for the fuel gas and air, to which valves bell crank 68 is attached by a link 69 and suitable arms. It is immediately apparent from such connection that the pressure in the receiver B will control the admission of air and fuel gas and that the parts may be so adjusted as to produce any desired pressure in the receiver B, and that after being once so adjusted the same degree of pressure will be continued.

Provision is made for the use of liquid as fuel in the following manner, as shown in Fig. 3, in which the numeral 70 indicates a needle valve which is pressed against its seat 71 by a bell crank lever 72 and spring 73. A chamber 74 is provided around valve 70 which chamber is filled with liquid by a tube 75 from an elevated reservoir 76, under its head pressure. The cylindrical part 77 is slidably mounted within casing 78 and is guided by a pin 79 working in a slot in said part to keep it from turning. A screw 80 is connected by its threaded end with cylinder 77. The unthreaded portion of screw 80 is made square and fitted in a corresponding bushing 81 which latter is guided by flanges 82 on casing 78. The bushing 81 has an arm 83 extending upward therefrom and connecting with a lever 84 which lever is pivotally mounted on an arm 85 on the casing 86. The opposite end of lever 84 is pivotally connected with a bell crank 87 which is pivotally mounted in a stationary arm 88 of the casing. The other arm of crank 87 is pivotally attached to the upper end of piston 89 placed on mixer B to control the pressure. A coil spring 90 is provided within the casing chamber above piston 89 to lower the piston.

Needle valve 70 opens into a chamber 91 which has an opening 92 therefrom into interior 93 of the compression cylinder or the explosion chamber, which opening 92 is controlled by needle valve 94. Alongside of chamber 91 is placed a chamber 95 which is connected to chamber 91 by means of valve 96, which valve is double seated and pressed against its seats by spring 97. Valve 94 is pressed against its seat by spring 98. Chamber 95 is connected with tank 99 by tube 100 which tank is filled with air under constant pressure through admission tube 101. Valve rod 94 has the sleeve 102 attached thereto by a suitable set screw within chamber 91, which sleeve may be adjusted at any desired distance from the end of valve 96 so that when sleeve 104 strikes against plate 105 in withdrawing valve rod 94 from its seat, sleeve 102 will strike the end of valve 96 pressing it back from its seat and admitting the air from chamber 95 into chamber 91.

A bell crank lever 103, which is pivotally attached to a fixed arm 108 on the casing operates valves 94 and 96. The vertical arm of lever 103 is attached mid-way of its length to sleeve 104 which is slidably mounted on valve rod 94 to operate said rod by striking plate 105. The upper end 106 reaches opposite the end 107 of slidably mounted screw 80. The horizontal arm of lever 103 extends out and is pivotally attached to a connecting link 109 which is attached at its lower end to a lever arm 110 pivotally attached to a wrist 113 on the casing which supports roller 111. Roller 111 bears on cam 112 on horizontal shaft 15. Cam 112 has the depression 114 and the extensions 115 and 116, which all perform certain functions as will be further herein set forth.

Cam 112 is slidably mounted on shaft 15 and its motion is controlled by lever arm 117 engaging in slot 118 in the end of the cam, the opposite end of arm 117 being pivotally attached to a suitable lug on the casing. Arm 117 is operated by link 119 which is pivotally attached to the lower end of lever 120. Lever 120 is in turn pivotally attached to a lug 121, the upper end of lever 120 being attached to piston 122 which works in port 123 admitting to the compression cylinder 93. A spring 124 presses against the outer side of the upper end of lever arm 120 to close the port.

I will now describe the operation of the engine. In starting the engine, the heat generator A is uncoupled from the turbine C by means of a suitable clamp 149 on the main driving shaft 15. The generator A will be started into motion by an electric motor or any other suitable power which is coupled on to the drive shaft 15 by a suitable clutch 125. The opening 50 is closed by valve 51 by a lever, not shown, and the burned gases, heated air, and steam for the motive fluid are stored up in receiver B until a sufficient pressure is obtained to start the turbine C. The valve 51 is then opened and the mixture of burned gases, heated air and steam starts the turbine into rotation and will be governed by the governor 60. The clamp 149 is then closed and the clamp 125 is uncoupled, thereby transferring the generator to the turbine, and thereafter a certain portion of the turbine's power will be utilized to run the heat generator. When gas fuel is used, the gas is admitted through pipe 24 valves 26 and 21 to the mixing chamber 19, and the air is simultaneously admitted through pipe 23 and valves 27 and 20 to said mixing chamber. Hence, when the piston 12 makes the outward stroke a constant mixture of air and gas will be sucked into the cylinder through valve 18. By the inward stroke of piston 12 the mixture will be pressed together until it is self-ignited by the temperature caused by compression. The pressure in the explosion chamber after the explosion will be greater than the pressure in chamber 32, consequently the valve piston 16 will be raised and a portion of the burned gases and heat will pass through port 17 into the mixer B. As the pressure diminishes in the explosion chamber by the passage of part of the burned gases and heat through port 17, the piston 16 will have a tendency to drop down and close port 17. To avoid this, piston 12 continues its inward stroke thereby always keeping the pressure on piston 16 greater than the pressure in chamber 32 and thus allowing and compelling the passage of the burned gases and heat through port 17 into the mixer B until all the gases and heat are driven out of the explosion chamber and piston 12 reaches its highest point or the dead center of arm 14, after which it will begin its outward stroke. Piston 16 on account of the pressure in chamber 32 will follow piston 12 downward in close connection closing port 17 and passing down until the pressure in chamber 36 equals the pressure in chamber 32. In this manner the capacity of the explosion chamber 93 is controlled and none of the burned gases or heat are allowed to flow back from the mixer into the compression cylinder. After piston 16 reaches its balanced position closing port 17, piston 12 continues its outward stroke thereby causing a vacuum and the suction opens valve 18 admitting a new charge of air and gas into the cylinder and the whole process is repeated.

As above described, the moment the explosion occurs, the explosion pressure presses back piece 38 and water or air under pressure greater than the pressure in the explosion chamber as a cooling medium will be injected into the explosion cylinder, coming into direct communication with the heat and burned gases. The movement of the piece 38 and also the time of the injection of the water is regulated by the explosion pressure, so that the amount of water depends upon the height of the explosion pressure; that is, the higher the explosion pressure, the more the piece 38 will be pressed back and accordingly more water will be furnished. However the volume of steam is small compared with the volume of heat produced.

Let it be noted that a special compression chamber is not needed in this invention like those used at the present time in all combustion and explosive engines. Instead the explosion occurs in a part of the cylinder through which the working piston passes. According to the amount of gas and air sucked into the cylinder, the explosion will occur at any time of the compression stroke when the temperature of the fuel has reached its ignition point. The gases, heated air and steam are mixed in the receiver or mixer B by being driven back and forth around the partitions 49 and thence pass out through valve opening 50 into the turbine cylinder 52, where they, by the peculiar curve of blades 59, turn the turbine cylinder 56. At the same time a portion of the mixture balances the weight of the turbine cylinder 56 by passing into chamber 57. After passing through the series of blades 59 and 59', they pass out through the channel 53 around cylinder 52 and out of exhaust port 54. The attachment of driving shaft 15 to the machinery to be driven is accomplished by suitable pulleys.

When liquid fuel is used, the liquid is placed in reservoir 76 and the chamber 74 is kept constantly filled from reservoir 76 through tube 75. The chamber 95 also is filled with air under pressure from tank 99 through tube 100 under pressure greater than within the compression cylinder. The air in chamber 95 is to drive out the liquid fuel from chamber 91. Let it be borne in mind, however, that a fresh supply of air is necessary in the explosion chamber after each explosion, which supply of air is obtained through pipe 23, and valves 18, 20 and 27 by the suction of piston 12 as above described concerning the use of gas as fuel.

The liquid fuel is fed into the explosion cylinder in the following manner: Drive shaft 15 is caused to turn as above described, thereby turning cam 112, and moving bell crank 103 through roller 111 and link 109. Cam 112 causes bell crank 103 to push screw 80 inwardly operating bell crank 72 and causing it to raise needle valve 70, admitting a charge of the liquid fuel to chamber 91. This occurs when roller 111 reaches the depression 114 on cam 112. The continued revolution of cam 112 causes bell crank 103 to move in the opposite direction or away from screw 80, allowing screw 80 to be returned to its normal position by spring 73, and closing valve 71. The continued revolution of cam 112 brings enlargement 115 to bear against roller 111, and causes sleeve 104 on bell crank 103 to press out on plate 105, which plate is attached to the outer end of valve 94, thereby opening said valve, and simultaneously, by means of sleeve 102 on valve rod 94, opening valve 96. The air pressure from chamber 95, which is greater than the pressure in the explosion chamber, presses the charge of liquid fuel out of chamber 91 through passage 92 into the explosion chamber 93, where it mixes with the charge of air drawn in through valve 18 by the suction of piston 12, and is exploded by the compression of piston 12 in the same manner in which the gas and air were exploded.

By injecting the liquid directly into the compression cylinder, the drops of liquid that hang around the orifice would gradually cause a coating that would eventually block the orifice and at the same time the injected liquid would not be sufficiently mixed with the air in the cylinder. To have good combustion, the liquid is forced by air under pressure into the compressed air in the cylinder. The admission of the air under pressure with the liquid into the compression chamber produces a fine spray which is blown into the cylinder and thoroughly mixes with the compressed air therein.

It is apparent that the admission of air under pressure to chamber 91 would prevent the flow of liquid fuel into said chamber through valve 70. Accordingly valve 94 is opened and closed during the time of the suction stroke of the piston 12 in the cylinder when the pressure in the chamber 91 is reduced to the corresponding pressure in the explosion chamber 93 by the suction stroke. This happens when roller 111 comes in contact with extension 116 of cam 112. Cam 112 has a sliding motion on shaft 15 caused by lever 117, link 119, lever 120, and piston 122, which piston is in connection with the compression cylinder in port 123. When the compression cylinder by each suction stroke is sucked full of air the pressure on piston 122 by the compression of the air will be greater at a certain point of the stroke than that of its closure spring 124 and the outward movement is transferred through said levers and link to cam 112 causing it to come in contact with roller 111 at a different point on extension 115, said extension 115 being placed obliquely across the surface of said cam as shown in Fig. 3; thereby a constant quantity of air will be used for injecting the liquid into the cylinder. Should the cylinder be sucked full of air by each suction stroke of the piston, the injection of the air and liquid would take place simultaneously with the piston stroke and the cam in this case would act the same as a stationary cam. But should the cylinder not be sucked full of air at each suction stroke of the piston the pressure to overcome the spring 124 will take place later in the compression stroke of the piston and should the cam be stationary the injection of air and liquid would take place at the same time as before; but the pressure in the cylinder in this case would be lower and the difference between the pressure in the cylinder and the air tank would be greater, consequently a greater volume of air would be injected with the liquid into the cylinder to equalize the pressure in the cylinder and air tank. Accordingly to have a constant volume of air injected into the cylinder, cam 112 has a sliding movement on shaft 15, which is regulated by the pressure in the cylinder as above described.

Figures 5, 6:
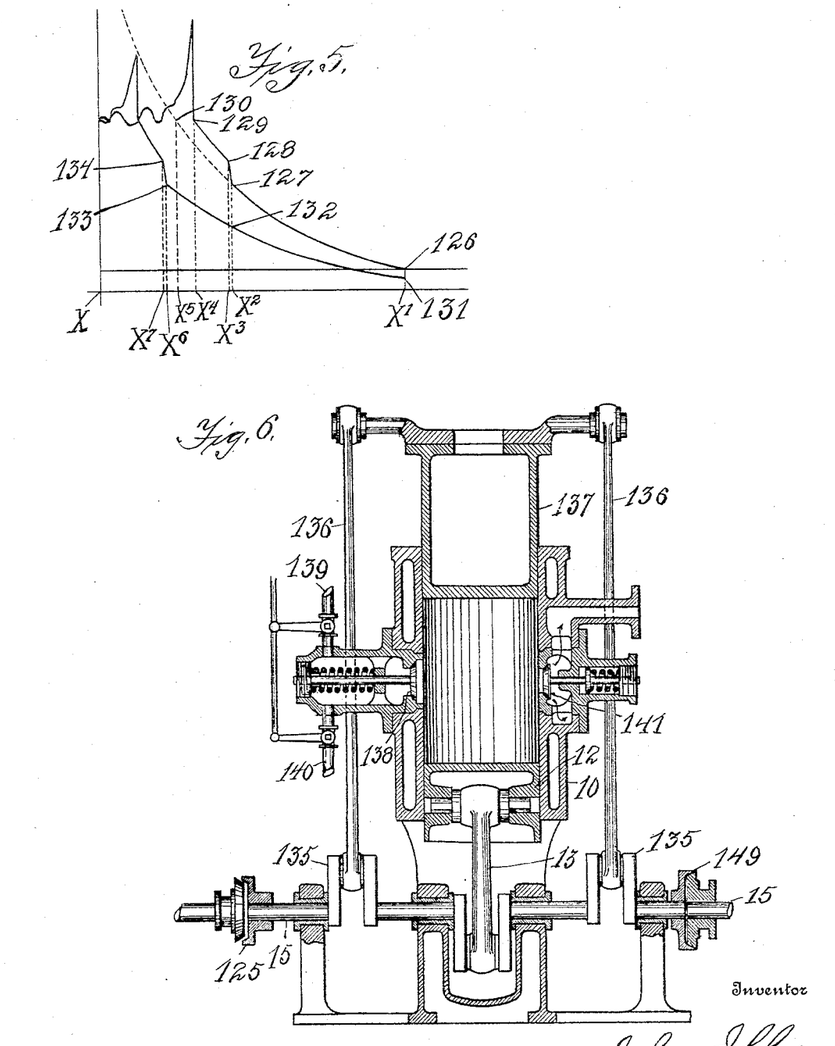
Fig. 5 is a diagram illustrating the cycle of operation.
Fig. 6 is a sectional view of a modification of the explosion chamber with double reciprocating pistons.

The cycle of explosive operation will be better understood by referring to the diagram shown in Fig. 5. Should the cylinder be sucked full of air, the pressure in the cylinder at the end of the suction stroke would be atmospheric. The letters $X X'$ represent the length of the stroke of the cylinder piston. The term $X'$ 126 indicates the atmospheric pressure at the commencement of compression stroke. By compression of air only without injecting of anything, the pressure will raise from 126 to 127 and upward as shown in dotted line. When the piston passes from $X'$ to $X^2$, then $X^2$ 127 would represent the pressure in the cylinder at this point. By the injection of liquid with air under pressure higher than that existing in the cylinder, the pressure in the cylinder and air tank being equalized, the pressure is raised from $X^2$ 127 to $X^3$ 128 from which it is still further compressed by the piston on its inward stroke until pressure $X^4$ 129 is reached which is the ignition point of the fuel and the explosion sends the pressure straight up, as indicated. When liquid alone is used without a medium, the explosion would take place later or at the point $X^5$ 130. We can see from this demonstration that by introducing the air the ignition point is greatly hastened.

Should the admission of air into the cylinder by suction stroke be less, the pressure will also be less than atmospheric as indicated by $X'$ 131. The curve for compression is also lower than before and in the same horizontal plane at $X^2$ the pressure is only $X^2$ 132. Also the difference between the constant pressure in the air tank and the pressure in cylinder is much greater than before, and consequently too great an air volume would enter at this point should the cam be stationary. By the sliding action of the cam, however, and the oblique placing of enlargement 115 across the outer surface of the cam, it is possible to bring part 115 and roller 111 in contact just when the pressure $X^6$ 133 is reached, which point is equal to $X^2$ 127 and the same rise in pressure from $X^6$ 133 to $X^7$ 134 is visible, and the same quantity of air enters the cylinder.

The burned gases, heat and steam are forced into the receiver or mixer B through passage 17 in the manner above described. The pressure of the gas and heat within the mixer B is equalized by mechanism similar to that above described for controlling said pressure when gas is used as fuel. A piston 89 is connected by suitable bell crank levers to screw 80 so that the movement of piston 89 caused by the variation of the pressure in receiver B is transferred through levers 84, 87 and arm 83 to screw 80, which latter by its movement through said levers and piston will increase or decrease the distance between point 106 of lever 103 and the end 107 of screw 80, thereby increasing or decreasing the backward or forward movement of screw 80, and giving a larger or smaller lift to valve 70 and accordingly a larger or smaller quantity of the liquid fuel will pass into the chamber 91.

In the modification shown in Fig. 6 the double equalizing pistons are mechanically constructed so as to be reciprocally drawn toward each other by the driving shaft 15. Piston 12 in cylinder 10 is operated by rod 13 and crank 14, as already described. An additional pair of cranks 135 are placed on shaft 15 at each side of the cylinder, which cranks are connected by the double piston rods 136 to piston 137 which corresponds to piston 16. It is apparent that the revolution of shaft 15 would cause the pistons to converge against one another and thereby compress the volume within the cylinder. The minimum length of the cylinder volume accordingly must equal the sum of the diameters of the circles described by the different cranks. The gas and air are admitted through pipes 139 and 140 to valve 138 which valve corresponds to valve 18 of the preferred form. The seat of valve 138 is on the inner side of the cylinder so that the valve will be moved inward by the suction of the pistons. The heat and gases are driven out through a valve 141 in the side of the cylinder; the seat of said valve 141 being on the outside of the cylinder so that it is moved outwardly by the inward movement of the pistons and the suction of the outward movement of the pistons draws the valve more closely on to its seat. Valve 141 is also closed by the pressure in the receiver B.

Figures 7, 8:
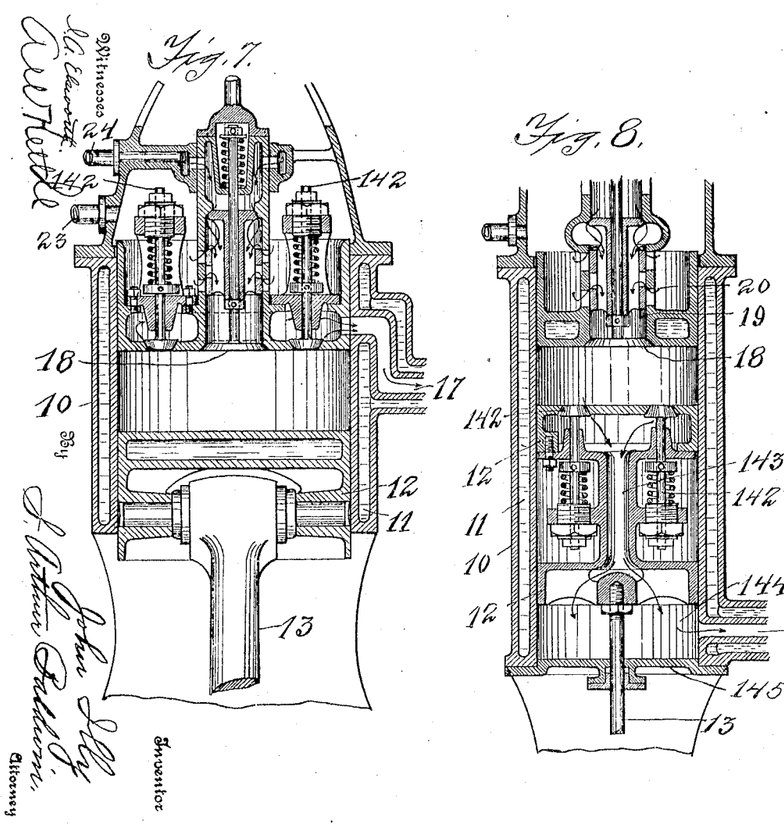
Figs. 7, 8 and 9 are sectional views of the explosion chamber showing modifications in the arrangement of the same.
Figure 9:
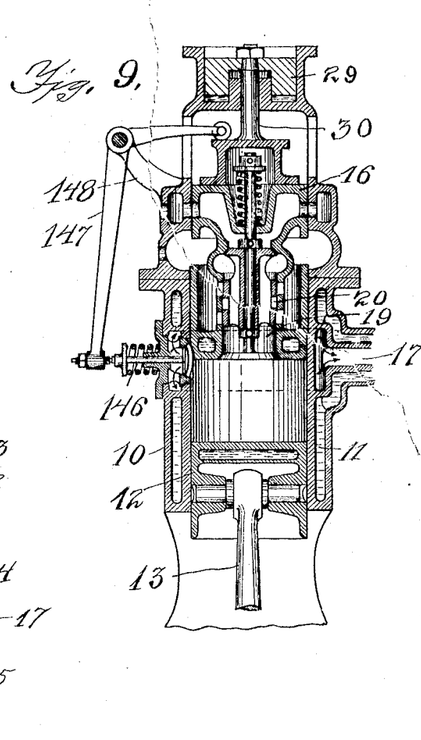

The modifications of the explosion chamber shown in Figs. 7, 8 and 9 are as follows: In Fig. 7 a fixed or non-movable upper piston or closure is shown, having a central valve 18 and showing a valve 142 each side of central valve 18 through which the gases and heat are forced into passage 17 to the mixer B by the upward movement of piston 12. It is apparent that the seats of valves 142 are the opposite of the valve seat for valve 18 and that the suction of the outwardly moving piston 12 would only draw valves 142 the closer to their seats.

In Fig. 8 the exit valves 142 for the heat and burned gases and steam are placed in the working piston 12, said piston being arranged with a central passage 143 and a closed chamber 144 at the lower end of the cylinder 10, the port 17 to the mixer B extending out from the chamber 144. Stem 13 of piston 12 works through a suitable opening in the closure 145 at the bottom of cylinder 10.

In Fig. 9 the opening to the port 17 is controlled by a valve 146, which valve is moved inwardly by means of the upward moving piston 16 under pressure from the upward movement of piston 12 by means of a bell crank 147, which crank is pivotally attached to arm 148 on the casing and has one arm attached to the valve stem and the other engaging the top of piston 16 by means of a suitable roller, so that as the piston 16 is moved upward by the explosion pressure by inward movement of piston 12, crank arm 147 pushes forward on valve 146 allowing the escape of the burned gases, heat, and steam to the receiver B.

It is apparent that by introducing both air and water into the explosion or combustion chamber 93, and also into the mixer B, as desired, immediately after each recurring explosion, the temperature of the heat units is so controlled that nearly all the thermal units are utilized for the expansion of fluids; and that these are so confined as to get the least loss from the latent heat and condensation of the fluids. A condensation plant is not needed. It is also obvious that there is no change in the physical state of the air injected, so that the heat given to it is available for immediate conversion into work. As hereinbefore stated, the air is injected into the explosion chamber under pressure greater than the pressure in these compartments. The air acts as a cooling medium as above stated. It also acts as a cleansing and scavenging medium for the explosion chamber, expelling the gaseous products of combustion with the assistance of the stroke of the piston.

One of the principal advantages of this form of heat generator, with its mechanical ignition of the fuel by compression, is the wide range allowable in the ignition of the fuel by igniting the fuel by compression in a chamber which decreases in volume to zero. A combination fuel may be used in which one fuel may have a low igniting point and others may be graded to those having a higher igniting point, so that in the same fuel charge light and heavy fuels of different degrees of ignition may be used and all the heat accumulated, the low igniting fuels assisting to burn those having high igniting points. The movement of the compression piston up through the explosion chamber assures of the entire ignition of the combination charge and scavenges the chamber. Heavy and light fuels may thus be used together, the light fuel being the fire starter. Such a method of mixing fuels of low and high igniting point reduces the pressure necessary for ignition and in like manner reduces the stress upon the walls of the combustion chamber.

I claim as new:—

1. In a heat generator, a cylinder, means for admitting fuel to said cylinder, pistons slidably mounted in said cylinder, means for compressing said fuel between said pistons to explode the same, an outlet from said cylinder automatically opened for all the hot products of combustion before change of direction of said fuel compressing means, said outlet automatically opened by said explosion.

2. In a heat generator, a cylinder, valvular admittance for fuel to said cylinder, a piston slidably mounted in each end of said cylinder, an outlet from said cylinder having a resilient closure, and means for operating said pistons to explode said fuel by compression before the end of the stroke and to press the hot products of combustion and heated air through said outlet by the stroke of said piston.

3. In a heat generator, a cylinder, valvular admittance for fuel to said cylinder, a piston slidably mounted in each end of said cylinder, said cylinder having an outlet controlled by one of said pistons, and means for operating said pistons to explode said fuel by compression before the end of the stroke and to press the hot products of combustion and heated air through said outlet.

4. In a heat generator, a cylinder, a valve piston in one end of said cylinder, and a compressor piston in the other end of said cylinder, means for admitting fuel to said cylinder, and means for operating said pistons to explode said fuel in a part of said cylinder afterward passed by the compression piston.

5. In a heat generator, a cylinder, means for admitting fuel to said cylinder, a valve piston and a compression piston in said cylinder, means for actuating said compression piston to explode said fuel in said cylinder between said pistons, said actuation of said compression piston continued in the same direction by said actuating means to thereby scavenge said cylinder.

6. In a heat generator, a cylinder, means for admitting fuel to said cylinder, a valve piston and a compression piston in said cylinder, means for resiliently holding said valve piston, means for actuating said compression piston to explode said fuel between said pistons and move said resilient valve piston, said compression piston having continued actuation through the explosion portion of said cylinder to scavenge the same.

7. In a heat generator, a cylinder, means for admitting fuel to said cylinder, an outlet from said cylinder, valve and compression pistons slidably mounted in said cylinder, means for holding said valve piston in said cylinder below said outlet, and means for moving said compression piston up to said outlet to explode said fuel and scavenge said cylinder.

8. In a heat generator, a cylinder, a compression piston in one end of said cylinder and means for actuating the same, a movable piston in the other end of said cylinder, valvular admission for the combustible fuel through said movable piston, and means for controlling the amount of movement of said movable piston.

9. In a heat generator or compressor, a cylinder, a movable valve piston in said cylinder, an inlet valve in said piston, a mixing chamber in said piston, gas and air inlet valves for said mixing chamber, said movable valve piston controlled by pressure equal to or greater than the pressure necessary for ignition of the fuel, and a compression piston in said cylinder.

10. In a heat generator or compressor, a cylinder, a movable valve piston in said cylinder, a differential piston connected to said valve piston, said differential piston operating between two oil chambers, and means for controlling the pressure in said oil chamber.

11. In a heat generator or compressor, a cylinder, a movable valve piston in said cylinder, a differential piston connected to said valve piston, said differential piston operating between two oil chambers, an adjusting screw and hand wheel to control the pressure in said oil chambers, and a compression piston in said cylinder.

12. In a heat generator, a combustion chamber, a stationary valve in the walls of said chamber, a perforated spring valve seat extending around said stationary valve in the walls of said chamber, and means for exploding gas in said chamber to depress said valve seat around said stationary valve to inject liquid into said chamber.

13. In a heat generator or compressor, a combustion chamber, a double chambered fuel valve in the side of said chamber, means for igniting fuel in said combustion chamber, means for admitting air under pressure greater than the pressure of said combustion chamber to the outer of said double chambers, a supplemental valve to admit fuel to the inner of said double chambers, and a common means for the simultaneous actuation of said valve.

14. In a gas engine, an explosion chamber, means for exploding the gas in said chamber, a mixing chamber for the heat and the hot products of combustion connected to said explosion chamber, and means actuated by each explosion to inject fluid under pressure into both of said chambers.

15. In a gas engine, an explosion chamber and means for exploding gas in said chamber, a mixing chamber for the heat and the hot products of combustion connected to said explosion chamber, and means for admitting fluid under pressure into both of said chambers immediately after each explosion.

16. In a gas engine, an explosion chamber, a mixing chamber connected to said explosion chamber, means actuated by the explosion in said explosion chamber to admit water under pressure to both the explosion chamber and the mixing chamber to form an energy carrier, substantially as and for the purpose specified.

17. In a gas engine, a combustion chamber, means for injecting fuel into said chamber, a mixing chamber connected with said combustion chamber for the heated product of combustion, and means for controlling the amount of said fuel according to the variation of the pressure in said mixer.

18. In a gas engine, an explosion cylinder, a compression piston in said cylinder, a shaft to drive said piston, a cam slidably mounted on said shaft, a fuel valve having suitable connections to said cam to actuate the same, a chamber for said fuel, an air chamber to receive the air under pressure, a double valve admitting said air to said fuel chamber and to said explosion cylinder, substantially as and for the purpose specified.

19. In a gas engine, an explosion cylinder, a compression piston in said cylinder, a shaft to drive said piston, a cam slidably mounted on said shaft, a fuel valve having suitable connections to said cam to actuate the same, a chamber for said fuel, an air chamber to receive the air under pressure, a double valve admitting said air to said chamber and said explosion cylinder, a port in said explosion cylinder, a piston in said port, a link and lever connection from said piston to said sliding cam to control the same by the pressure in said cylinder, substantially as and for the purpose specified.

20. In a gas engine, a combustion cylinder, a water injector to said chamber consisting of a movable cylinder, a valve seat in said cylinder, a hollow fixed valve through which the water enters, and a spring to press said valve seat on said fixed valve, substantially as and for the purpose specified.

21. In a heat generator or compressor, a cylinder 10, a compression piston 12 in the lower end of said cylinder and means for operating the same, a piston 16 slidably mounted in the upper end of said cylinder having the mixing chamber 19 therein, a spring valve 18 at the lower end of said mixing chamber, air valves 20 and 27 admitting to said mixing chamber, gas valves 21 and 26 admitting to said mixing chamber, an extension 30 on the upper end of piston 16, a piston 29 on said extension working in a pressure chamber, substantially as and for the purpose specified.

In testimony whereof I have signed my name to this specification in the presence of two subscribing witnesses.

JOHN ILLY.

Witnesses:
A. L. FURLOW,
I. A. ELSWORTH.